United States Patent [19]
Mayer

[11] Patent Number: 5,220,808
[45] Date of Patent: Jun. 22, 1993

[54] AIR CONDITIONING UNIT FOR MOTOR VEHICLE, PARTICULARLY OMNIBUSES

[75] Inventor: Helmut Mayer, Neuried, Fed. Rep. of Germany

[73] Assignee: Webasto Klimatechnik GmbH, Grafelfing, Fed. Rep. of Germany

[21] Appl. No.: 720,764

[22] PCT Filed: Sep. 12, 1990

[86] PCT No.: PCT/EP90/01538

§ 371 Date: Jul. 5, 1991

§ 102(e) Date: Jul. 5, 1991

[87] PCT Pub. No.: WO91/04164

PCT Pub. Date: Apr. 4, 1991

[30] Foreign Application Priority Data

Sep. 12, 1989 [DE] Fed. Rep. of Germany ....... 3930429

[51] Int. Cl.$^5$ ............................................. B60H 1/32
[52] U.S. Cl. ................................. 62/244; 62/DIG. 16
[58] Field of Search ................... 62/DIG. 16, 244, 409

[56] References Cited

U.S. PATENT DOCUMENTS

| | | | |
|---|---|---|---|
| 3,848,428 | 11/1974 | Rieter, Jr. ......................... | 62/244 X |
| 3,921,416 | 11/1975 | Murnane et al. ................. | 62/409 X |
| 4,043,143 | 8/1977 | Fluder et al. ..................... | 62/244 X |
| 4,098,093 | 7/1978 | Czyl .................................. | 62/244 X |
| 4,144,719 | 3/1979 | Williams et al. .................. | 62/244 X |
| 4,201,064 | 5/1980 | Krug et al. ....................... | 62/244 X |
| 4,727,728 | 1/1988 | Brown ............................... | 62/244 |
| 4,882,913 | 11/1989 | LaCount, II et al. ............. | 62/409 |

Primary Examiner—William E. Tapolcai
Attorney, Agent, or Firm—Fishman, Dionne & Cantor

[57] ABSTRACT

An air conditioning system for motor vehicles having a flat roof construction for installation of the air conditioning system on the roof, is presented. The air conditioner comprising a condenser unit accommodated in a housing part and an evaporator unit accommodated in another housing part, wherein one of these two units in the direction of travel is mounted substantially in line behind the other of the two units. The evaporator unit has an inside housing part in which a circulating air opening from the passenger compartment opens out, through which the air from the passenger compartment via evaporator registers and/or heating registers which extend substantially parallel to the direction of travel, as well as via a blower arrangement can be fed back into the passenger compartment. The evaporator unit lies in the direction of travel in front of the condenser unit and in the front face of its housing part has a fresh air inlet opening that can be closed off. The inside part of the housing around the circulating air opening is surrounded by inside partitions of the housing part of which the lateral partitions comprise circulating air flaps that can be opened and closed. A rear partition of the inside part of the housing has a waste air flap that can be opened and closed, via which the air from the passenger compartment or the inside part of the housing can be discharged into the air flow path of the condenser unit.

12 Claims, 2 Drawing Sheets

AIR CONDITIONING UNIT FOR MOTOR VEHICLE, PARTICULARLY OMNIBUSES

BACKGROUND OF THE INVENTION

The invention relates to an air conditioning system for motor vehicles, in particular buses. Air conditioning systems of this type are known in several constructions and are described, for example, in the German patent specification 33 24 895.

With air conditioning systems of the last mentioned construction the condenser unit lies in the direction of travel in front of the evaporator unit. The tubes of the condenser heat exchanger extend transversely to the direction of travel and the front face of the condenser heat exchanger is inclined forwards in relation to a horizontal plane. A blower associated with the condenser heat exchanger sucks the air from a fresh air inlet in the front face through the heat exchanger of the condenser, and then gives it off upwards. In the direction of travel behind the condenser unit of the known air conditioning system, without any connection of the respective air flow paths, the evaporator unit operates in such a way that the circulating air drawn from the passenger compartment via the circulating air opening is passed through the tubular register of the heat exchanger of the evaporator unit, which register extends substantially along the direction of travel, and is pressed back into the passenger compartment by the blowers.

With known air conditioning systems of the type indicated in the foregoing, among others the fact that the operation of the evaporator unit is dependent on the construction and functioning ability of the ventilation and aeration of the passenger compartment provided in the motor vehicle in question is found to be a disadvantage, as the evaporator unit, especially if arranged in the direction of travel behind the condenser unit on the roof of the motor vehicle or the roof of the bus, cannot readily be reached by the fresh air inlet ducts without increasing the overall height and cross-section of the air conditioning system.

SUMMARY OF THE INVENTION

It is therefore an object of the invention to design an air conditioning system for motor vehicles, in particular buses, of the flat type for installation on the roof in such a way that at a minimum overall height and without widening or significant changes in the outline, an air conditioning treatment can take place of the fresh air to be fed into the passenger compartment independent of the ventilation and aeration systems or the air inlet and air outlet openings of the motor vehicle itself.

According to the invention there is provided an air-conditioning system for motor-vehicles, of a flat construction for installation on the roof, comprising a condensor unit accommodated in a housing part and an evaporator unit accommodated in another housing part, wherein one of these two units in the direction of travel is mounted substantially in line behind the other of the two units, and the evaporator unit has an inside housing part in which a circulating air opening from the passenger compartment opens out, through which the air from the passenger compartment via evaporator registers and/or heating registers which extend substantially parallel to the direction of travel, as well as via a blower arrangement can be fed back into the passenger compartment, characterized in that the evaporator unit lies in the direction of travel in front of the condenser unit and in the front face of its housing part has a fresh air inlet opening that can be closed off, and that the inside part of the housing around the circulating air opening is surrounded by inside partitions of the housing part of which the lateral partitions comprise circulating air flaps that can be opened and closed, and a rear partition of the inside part of the housing has a waste air flap that can be opened and closed, via which the air from the passenger compartment or the inside part of the housing can be discharged into the air flow path of the condenser unit.

It has been shown that also with an extremely small overall height of the air conditioning system, e.g. about 16 cm, an air inlet opening in the front face of the housing part enclosing the evaporator, also taking into account a minimum overall height, suffices to supply the desired quantity of fresh air, which can, as required, be cooled, heated or the like in the evaporator unit, and is then fed into the passenger compartment, from where the air via the circulating air opening in the roof of the motor vehicle flows into the inside part of the housing of the evaporator unit positioned above it and through the opened waste air flap in the rear partition of the inside part of the housing to the condenser unit, from where it is discharged into the atmosphere. Thus, with the air conditioning system indicated here, with regard to the supply of fresh air and the air discharge, a complete independence is obtained from the vehicle's own air inlet and air outlet systems, which can mean that in the case of new motor vehicles, in particular buses, fitted with the air conditioning systems indicated in the foregoing a considerable simplification and accordingly a saving of costs can be obtained.

If according to a very advantageous feature of the indicated construction, the cooled compartment air discharged is fed via the aforementioned waste air flap into the air flow path of the condenser, which in the direction of travel is mounted on the vehicle's roof behind the evaporator unit, an improvement in the overall efficiency of the system will be obtained.

In the following description of a preferred exemplified embodiment reference will be made to a number of possible modes of operation of an air conditioning system of the present type, which are associated with specific advantages.

In the following particulars of an air conditioning system according to the indicated principle are explained in greater detail based on an exemplified embodiment with reference to the drawing.

DESCRIPTION OF THE PREFERRED EMBODIMENT

Figure 1:
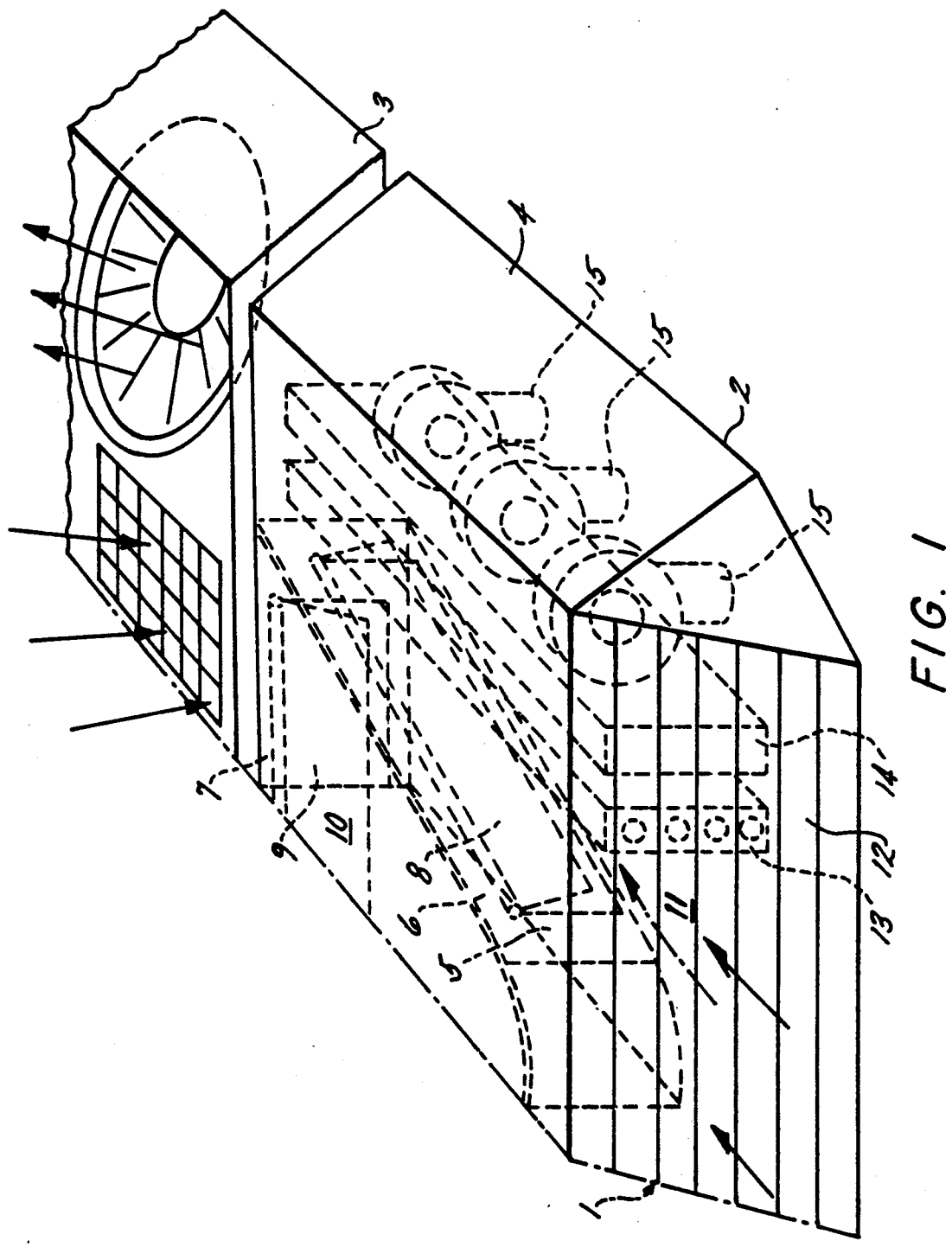
FIG. 1 shows a perspective representation of a cutout of an air conditioning system for motor vehicles for installation on the roof, wherein the left part of the system is cut off along a vertical longitudinal centre plane and the rear part of the condenser unit is shown broken off.

It must first of all be pointed that in order to simplify the drawing, pipes, valves, filters and the like of the cooling system have been omitted, as these details are known to one of ordinary skill in many constructions, so that only the evaporator unit and the condenser unit as the most important parts of the air conditioning system are indicated here in detail. Also regulating mechanisms, in particular pneumatic or electric regulating mechanisms as well as electric connecting wires have been omitted from the drawing, as these are also known to one of ordinary skill in the art. It is, however, expedient if the position of the indicated and described flaps and shutters can be adjusted in an infinitely variable manner or in fine steps in the overall regulating range.

Shown symmetrically to a longitudinal centre plane of the motor vehicle and the air conditioning system, the air conditioning system comprises an evaporator unit 2 and a condenser unit 3. The evaporator unit lies in the direction of travel in front of the condenser unit, and is as a whole accommodated in a quite flat rectangular housing part 4, the side walls of which may also be shaped differently from the illustrated slanted shape, and may for example have the outline indicated in FIG. 3, which shows a cross-section through the condenser unit. The cross-sections of the evaporator unit and condenser unit perpendicular to the direction of travel are at any rate chosen in such a way that the two units are aligned in the direction of travel in a way which is favourable for the flow.

The evaporator unit 2 is mounted on the roof of the motor vehicle in such a position that a circulating air opening 5 of a substantially triangular or trapezoidal shape (see FIG. 2) provided in the bottom of the housing part 4 covers a circulating air opening in the roof of the motor-vehicle in question. The circulating air opening 5 is surrounded by inside partitions 6 and 7 of the housing part 4 of the evaporator unit 2 in such a way that inside this housing part an inside housing part is formed positioned above the circulating air opening 5. The lateral partitions 6 extending at a slant to the direction of travel are provided with circulating air flaps 8, which are linked to the upper edge of elongated openings of the lateral partitions 6 and by means of a pneumatic regulating mechanism can be set in an infinitely variable manner or in fine steps between a position in which the opening in question is hermetically closed and a maximum opening position.

The rear partition 7, which may form an integral part of the rear wall of the housing part 4, is provided with a waste air flap 9, which serves to close off or open an opening provided in the rear partition 7 and is linked to the top edge of the opening. Also the waste air flap 9 can by means of a pneumatic regulating mechanism be set in an infinitely variable manner or in fine steps between a position in which the said opening is hermetically closed and a maximum opening position.

Figure 2:
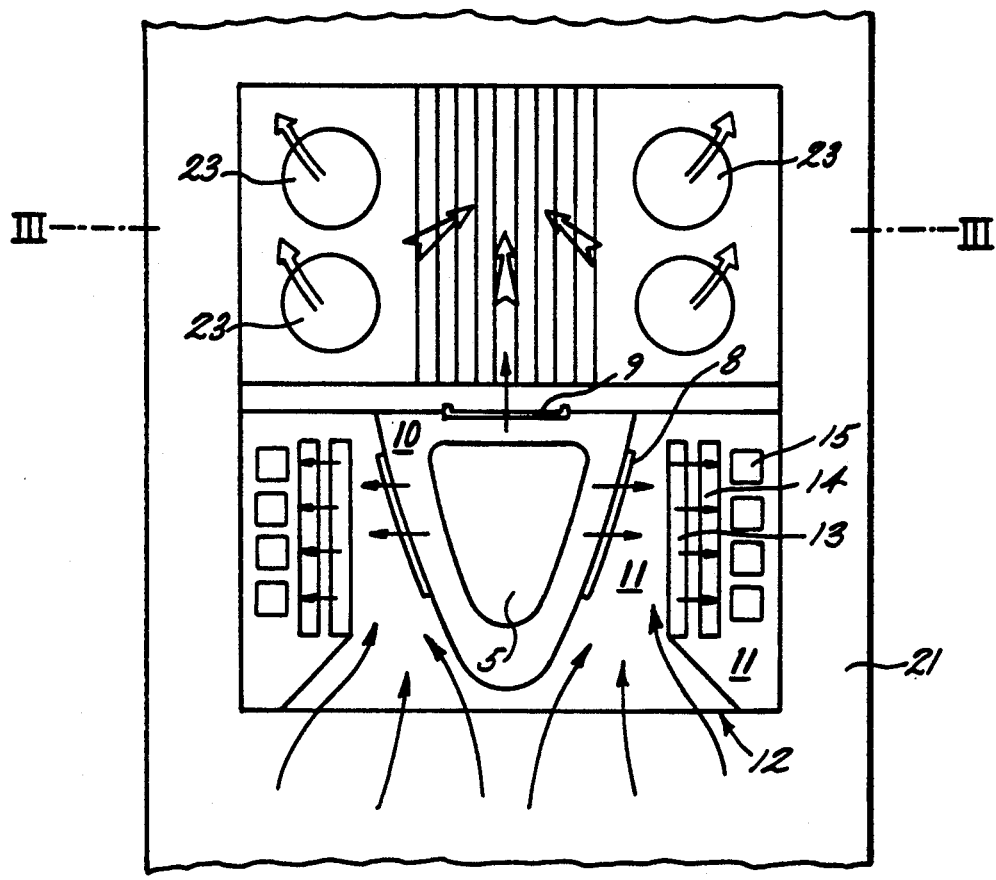
FIG. 2 is a diagrammatic representation of the air conditioning system according to FIG. 1 in a top view and on a smaller scale, after removing the top housing wall of the evaporator unit.

From FIG. 2 it can be noted that the inside of the housing part 4 of the evaporator unit 2 is divided by the inside partitions 6 and 7 into two sections, i.e. on the one hand the abovementioned inside part above the circulating air opening 5, which in the drawing bears the reference numeral 10, and the other housing part 11 which lies between the inside partitions 6 and 7 and the outside walls of the housing part 4.

In the front face of the housing part 4 of the evaporator unit 2 a fresh air inlet opening 12 is provided, which can be opened or closed by means of a shutter. The slats of the shutter extend substantially over the entire width of the housing part 4 and by means of a pneumatic regulating mechanism can be set in an infinitely variable manner or in fine steps between the closed and the open position.

Arranged in the other housing part 11, substantially orientated in the direction of travel, are the tubular register 13 as an evaporator heat exchanger in the shape of an upright beam, as well as parallel thereto the heating register 14 of a similar outside shape, which follows the former in the direction of flow of the air. Via the registers 13 and 14, by means of blowers 15, air can be fed through the aligned housing and roof openings into the passenger compartment. Air flow short-circuits between the fresh air inlet opening 12 and the inlet openings of the blowers 15 are prevented by suitable built-in parts in the other housing part 11.

The chambers of the other housing part 11 that lie between the tubular registers 13 and the inside partitions 6 taper down in the direction of flow of the air or opposite to the direction of travel, corresponding to the reduction in volume of the air to be led off by the blowers 15.

Figure 3:
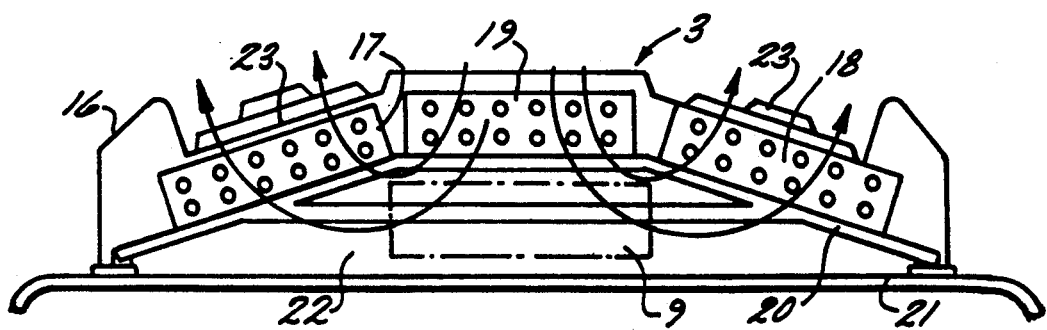
FIG. 3 is a section through the condenser unit along the line III—III indicated in FIG. 2.

The housing part 16 of the condenser unit 3 has the cross-sectional shape shown in FIG. 3, and covers three flat tubular registers 17, 18 and 19 as condenser heat exchangers, which extend parallel to the direction of travel and are mounted on a flat trapezoidal aluminum frame 20 which rests on the roof 21 of the bus. With reference to the cross-section shown in FIG. 3, the centre condenser heat exchanger 19 lies therefore some distance above the roof 21 of the bus parallel to same, whereas the lateral condenser heat exchangers 17 and 18 are positioned at a slant in such a way that underneath the condenser heat exchangers 17, 18 and 19 an air chamber 22 is formed, the shape of which is that of a prism with a flat trapezoidal cross-section, and which extends from the front wall of the housing of the condenser unit 3 to the rear wall.

Flat disk shaped condenser blowers mounted onto the housing part 16 suck up ambient air through an air inlet grate of the housing part 16 above the condenser heat exchanger 19, so that the ambient air enters the chamber 22 and then via the condenser heat exchangers 17 and 18 as well as the blowers 23 is again given off to the atmosphere. The arrangement of the condenser-evaporator with the tubular registers extending parallel to the direction of travel as well as on the aluminum frame 20 in the illustrated trapezoidal configuration ensures a favourable air flow, a good strength and a low overall height. What is of particular importance, however, is that the air chamber 22 of the condenser unit 3 can by means of the opening in the partition 7 or the rear wall of the housing part 4, which opening can be closed off by the flap 9, be put into communication with the housing part 4 in such a way that a waste air path is created between the inside part 10 of the housing and the air flow ducts of the condenser unit.

This construction and relative arrangement of the evaporator unit and condenser unit result in advantageous operating possibilities of the described air conditioning system, further details of which will be provided below.

A. If the flaps 8 and 9 of the evaporator unit 2 are hermetically closed, because of the dynamic pressure during the travelling, fresh air flowing into the other housing part 11 through the open or partly open shutter slats of the air inlet opening 12, can, after cooling or heating in the registers 13 or 14 respectively, also when the blowers 15 are switched off, be fed into the passenger compartment. This air is then discharged into the atmosphere by a ventilation system of the vehicle if the flap provided in the rear partition of the inside part 10 of the housing is closed. In this case, therefore, no use is made as yet of the advantageous property of an independence of the present air conditioning system from the air outlet openings of the motor vehicle. According to a very advantageous feature of the construction indicated here, the evaporator blowers 15 can be regulated in an infinitely variable manner, e.g. between 50 and 100% capacity, so that their power consumption can be adapted in an energy saving manner to the operating condition in question or the respective ambient conditions.

B. If, with the flaps 8 and 9 closed, the evaporator blowers 15 are switched on, the dynamic pressure of the air flowing into the housing part 11 through the air inlet opening 12 will assist the conveying effect of the blowers 15.

C. If now, with the shutters of the air inlet opening 12 open, the flap 9 is completely opened, the system has become independent of not only the vehicle's own air inlet openings, but also of the vehicle's own air outlet openings, as all the fresh air fed in through the air inlet opening 12, possibly after being treated in the tubular registers of the evaporator unit and after being fed by the blowers 15 into the passenger compartment, is again drawn off from same through the circulating air opening 5 and the open flap 9, and via the inside of the condenser unit is blown off into the atmosphere by means of the blowers 23. For this mode of operation the flaps 8 of the lateral partitions remain completely closed to prevent a short-circuit between the air inlet opening 12 and the air flow path via the flap 9 to the blowers 23.

It must be pointed out that with the above mode of operation the blowers 15 can be switched off whenever at a sufficient travelling speed the dynamic pressure at the air inlet opening 12 suffices to ensure a fresh air supply, and that the need for possibly treated fresh air in the passenger compartment during the travelling or also when the vehicle is standing still can be met solely in that, with the blowers 15 switched off, the flaps 8 closed and the flap 9 open, at least one of the blowers 23 sucks the fresh air through the air inlet opening 12 through the flow path which comprises the passenger compartment.

D. If the shutters of the air inlet opening 12 are completely closed and the flaps 8 in the partitions 6 are completely open, whereas the flap 9 in the partition 7 is completely closed, then the evaporator unit 4 can operate in the normal circulating air mode, with which the air flowing in from the passenger compartment through the circulating air opening 5 is cooled or heated by means of the tubular register 13 or 14 respectively, and is then pressed back again into the passenger compartment by the blowers 15.

E. With the last described mode of operation the air circulated by the circulating air mode can be supplemented with fresh air by partly opening the air inlet opening 12 to any desired extent, in which case the supplemented part is discharged into the atmosphere as waste air via the ventilation system of the motor vehicle if, as with the described modes of operation A and B, no value is attached to the advantageous property of the present air conditioning system of being independent of the motor-vehicle itself and the flap 9 is, therefore, kept closed.

F. Compared to the last described mode of operation, an independence from the ventilation system of the motor vehicle is obtained by partly or completely opening the waste air flap 9 in such a way that the branching off of the supplemented circulating air part to the atmosphere can take place independent from the ventilation system of the motor-vehicle.

With this latter mode of operation to a limited extent, but in particular with the mode of operation C, one obtains not only an independence from the ventilation system of the motor vehicle, but the efficiency of the condenser unit is improved if through the waste air flap 9 cooled compartment air is fed from the inside part 10 of the housing of the evaporator unit to the condenser.

G. Finally, mention must also still be made of the mode of operation in which the shutters of the fresh air inlet opening 12 and the circulating air flaps 8 are completely closed, and with the waste air flap 9 open, the blowers 23 of the condenser unit via the circulating air opening 5 place the passenger compartment under a partial vacuum in such a way that the ambient air enters the passenger compartment through small gaps and openings, and in this manner ensures a cooling of the passenger compartment by a supply of fresh air from the environment.

The condenser blowers 23, the same as the evaporator blowers 15, may be of such a design that they can be regulated within a wide range, so that at any time a regulated ventilation of the passenger compartment is possible via the circulating air opening 5 with the flap 9 completely or partly open.

If the air conditioning system as a whole is not in operation, all flaps are hermetically closed, so that no draught phenomena occur through the circulating air opening 5.

In conclusion it must still be pointed out that the construction of the condenser unit indicated here constitutes an invention which is independent of the indicated construction of the evaporator unit.

I claim:

1. An air conditioning system for use with motor vehicles having a flat roof construction for installation of the air conditioning system on the roof, comprising:
 a first housing part having a fresh air inlet opening on the front face of said first housing part, said fresh air inlet opening having open and closed positions;
 an evaporator unit accommodated in said first housing part, said evaporator unit including an inside housing part around a circulating air opening, said circulating air opening opens out to a passenger compartment of the motor-vehicle;
 at least one register disposed in said first housing part extending substantially parallel to the direction of travel, wherein air from said circulating air opening passes through said at least one register;
 evaporator blowers for feeding air from said at least one register back into the passenger compartment;
 inside partitions in said first housing part with lateral partitions comprising circulating air flaps having open and closed positions;
 a second housing part disposed in the direction of travel substantially in line behind said first housing part;

a condenser unit accommodated in said second housing part; and a waste air flap disposed on a rear partition of the inside part of said first housing part, said waste air flap having open and closed positions, wherein air from the passenger compartment via said circulating air opening is discharged into an air flow path of said condenser unit when said circulating air flaps are closed and air from the inside housing part is discharged into the air flow path of said condenser unit when said circulatory air flaps are open.

2. The air conditioning system of claim 1 wherein said at least one register comprises:

at least one evaporation register.

3. The air conditioning system of claim 2 wherein said at least one register further comprises:

at least one heating register.

4. The air conditioning system of claim 1 wherein said at least one register comprises:

at least one heating register.

5. The air conditioning system of claim 1 wherein said inside partitions delimit a portion of said first housing part above said circulating air opening which tapers downwardly when viewed from the direction of travel.

6. The air conditioning system of claim 1 wherein said fresh air inlet opening, said circulating air flaps and said waste air flap are actuated by means of regulating mechanisms, wherein the actuation is infinitely variable or in fine steps between a hermetically closed position and a maximum open position.

7. The air conditioning system of claim 6 wherein said regulating mechanisms are phneumatically operated.

8. The air conditioning system of claim 1 wherein said condenser unit comprises:

three flat tubular registers forming condenser heat exchangers, extending parallel to the direction of travel, the center one of which is disposed at a distance above the roof of the vehicle and directly under air inlet openings of the second housing part, the two lateral tubular registers are positioned at a slant in relation to a cross-section through the condenser unit, in such a way that the arrangement of the condenser heat exchangers delimits above the roof of the vehicle an air chamber with a flat trapezoidal cross-section, into which ambient air enters after flowing through the center tubular register, to then be drawn off again into the atmosphere by means of condenser blowers positioned above the lateral tubular registers.

9. The air conditioning system of claim 8 wherein said tubular registers forming the condenser heat exchangers are mounted on a metal support frame with a flat trapezoidal cross-section.

10. The air conditioning system of claim 9 wherein said metal support frame comprises aluminum.

11. The air conditioning system of claim 8 wherein said condenser blowers are mounted in an upwardly directed wall of said second housing part.

12. The air conditioning system of claim 8 wherein said evaporator blowers and said condenser blowers have a capacity which can be regulated infinitely variably or in fine steps within a specific regulating range.

* * * * *